Figure 1:
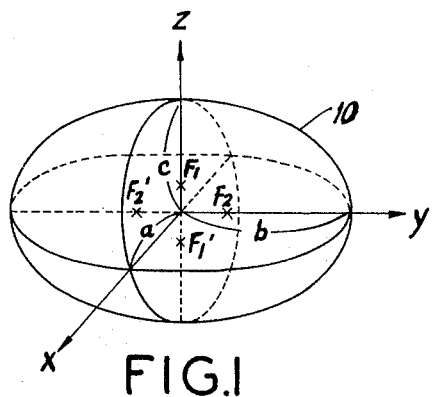

United States Patent

[11] 3,588,739

[72] Inventors Shogo Yoshikawa;
Ryuji Tatsumi, Tokyo, Japan
[21] Appl. No. 794,618
[22] Filed Jan. 28, 1969
[45] Patented June 28, 1971
[73] Assignee Nippon Electric Company, Limited
Tokyo, Japan
[32] Priority Feb. 2, 1968; Feb. 27, 1968; July 26, 1968; Nov. 16, 1968
[33] Japan
[31] 43/6608; 43/12412; 43/53197; 43/83676

[54] EXCITER DEVICE FOR SOLID-STATE LASER
4 Claims, 9 Drawing Figs.
[52] U.S. Cl. .................................................. 331/94.5, 350/293
[51] Int. Cl. ....................................................... H01s 3/09
[50] Field of Search ........................................... 331/94.5; 350/293

[56] References Cited
UNITED STATES PATENTS
3,238,470  3/1966  Mooney .......................  331/94.5

OTHER REFERENCES
Takaoka et al., " A Ruby Laser Unit," Oyo Butwi, 32, 1963, pp. 513— 19
Kamiryo et al., " Optimum Design of Elliptical Pumping Chambers for Solid Lasers," Jap. J. of Applied Physics, 5, (12) Dec. 1966 pp. 1217— 26

Primary Examiner—Ronald L. Wibert
Assistant Examiner—R. J. Webster
Attorney—Hopgood & Calimafde ABSTRACT: A laser exciter device is described which utilizes an ellipsoidally-shaped hollow reflector. Within the hollow of the reflector a light source and a lasing material are selectively placed to provide a high irradiation efficiency of the lasing material by the light source. Several embodiments are shown. Each of the embodiments locates the lasing material and light at a selective spacing from and parallel to a major axis of the ellipsoidal structure.

Patented June 28, 1971  3,588,739

INVENTORS
SHOGO YOSHIKAWA
RYUJI TATSUMI
BY
Sandoe, Hopgood & Calimafde
ATTORNEYS

EXCITER DEVICE FOR SOLID-STATE LASER

This invention relates to a laser exciter (the so-called laser head) for use in a solid state laser device and, more specifically, to those laser heads which have a very high excitation efficiency compared with conventional devices of the kind.

In a solid-state laser device, an exciting light source is employed to irradiate the laser material, and thereby to effect an optical pumping within the material. However, only a portion of the total irradiation light energy contributes to the optical pumping, because the absorption wavelength region of the laser material is limited. To attain a high excitation efficiency, therefore, the light rays emanating from the light source should be effectively concentrated onto the laser material. A number of proposals have so far been made in this regard.

In the D. Roess article entitled "Analysis of Room Temperature CW Ruby Laser," published in the IEEE Journal of Quantum Electronics, Vol. QE-2, No. 8 Aug. 1966), pages 208—214, a laser head is proposed comprising a prolate-spheroid-shaped reflector, which is an ellipsoid of revolution formed by turning an ellipse around its major axis, and within which the light source and the laser material are disposed on the major axis of the ellipse. To state more particularly, the light source and the laser material are positioned on the major axis of the prolate spheroid and their respective ends adjacent to the center of the prolate spheroid are positioned at or outside of the two foci of a selected ellipse. This ellipse is one which is located in a plane containing the major axis and intersects the prolate spheroid. Light rays emanating from the light source are reflected by the inner surface of the prolate spheroid and concentrated onto the laser material which is placed at a complementary position to that of the light source with respect to the foci. The laser element is, however, never irradiated directly by the light source output. Even if the reflective surface of the prolate-spheroid-shaped reflector forms an ideal reflector, a certain reflection loss is inevitable. Therefore, the irradiation efficiency cannot be sufficiently raised with this proposed laser head structure. Furthermore, since the laser element is placed in line with the light source on the major axis, a plane or concave mirror pair forming an optical resonator for laser oscillation cannot be disposed on the opposing sides of the laser element. Thus, it is impossible for the Roess device to provide a large active volume for the laser material.

Another article entitled "Die abbildende Beleuchtung Optischer Molekurvorstarker in elliptischen Spiegeln," published in the German periodical "Frequenz," Vol. 16, No. 11 Nov. 1962), pages 423—428, proposes an elliptic-cylinder-shaped reflector for a laser head. The light source and the laser element are respectively placed within the elliptic cylinder, in parallel with its axis. More accurately, they are placed on a plane which includes the cylinder axis and the major axis of the ellipse. The positions of the light source and the laser element respectively coincide with the two foci of the ellipse. Because of the nature of the foci of the sectional ellipse, the light rays emanating from the straight-lined light source disposed on one of the focus lines (foci) are reflected by the inner surface of the cylinder and concentrated onto the straight-lined laser element placed on the other of the focus lines. This proposed structure may be considered an improvement over the above-mentioned Roess device, because the direct irradiation is utilized. In this laser head, however, the light rays emanating obliquely from the linear light source are not totally incident upon the laser element. Even when a pair of plane reflectors are employed at openings in the ends of the cylinder, the obliquely emanating light components only reach the laser element after repeated reflections within the cylinder. For this reason, the irradiation efficiency is not satisfactorily high with this laser head structure.

The American periodical "Business Week" dated Dec. 2, 1967, carries on page 104 an article with the caption "Flooding a laser rod with light may prove best way to energize lasers, Westinghouse experiment indicates." The laser head described in this article utilizes a spherical reflector within which the light source and the laser material are disposed in face-to-face relationship with the center of the sphere interposed therebetween. The light source and the laser element should be placed as close to the center of the sphere as possible, to attain high irradiation efficiency. As will be readily understood, however, the diameter of the sphere must be quite large to accommodate the laser element as well as the light source. Particularly when the laser element is long, the diameter of the sphere becomes excessively and undesirably large.

It is, therefore, an object of the present invention to provide a novel laser head of improved irradiation efficiency.

It is a further object of the present invention to provide a novel laser head having an improved reflector structure to yield a high irradiation efficiency.

According to the present invention, there is provided a laser exciter which comprises an ellipsoid-shaped reflector, in general. The ellipsoid may be an oblate spheroid which is an ellipsoid of revolution formed by turning an ellipse around its minor axis, or it may be a prolate spheroid, a similar ellipsoid of revolution formed by turning the ellipse around its major axis.

In the case of the prolate-spheroid-shaped reflector, the straight-lined light source and the laser element are disposed in parallel with the major axis thereof. At the elliptical intersection including the center of the prolate spheroid and lying perpendicular to its major axis, the laser element and light source are located coincident respectively with the two foci of the intersection ellipse, so that the irradiation by the light source on one focus may be concentrated onto the laser element on another focus.

In the case of the oblate-spheroid-shaped reflector, the light source and the laser element are disposed in parallel on a plane including the circular locus of foci of the ellipse which is turned around its minor axis to form the oblate spheroid, and respectively tangentially to the locus. The irradiation by the light source placed on one side of the circular locus is effectively concentrated by the reflector disposed on the other side of the locus. To further enhance irradiation efficiency, the light source may be curved within the plane of the locus outwardly with respect to the center thereof, so that the real image of the light source formed by the reflector may overlap the laser element.

As will be understood from the foregoing, the structure of the present invention enables us to make more effective use of irradiation power and provide the room for the reflector pair to be inserted at two opposing sides of the laser element as the optical resonator.

Figure 2A:
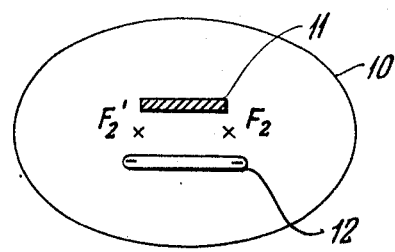
Figure 3A:
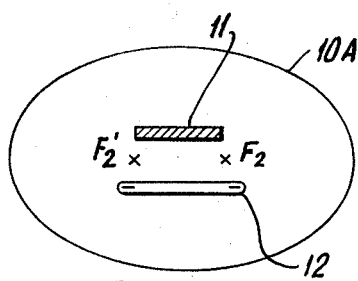
Figure 6:
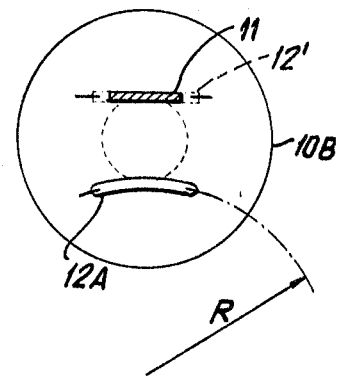
Figure 4:
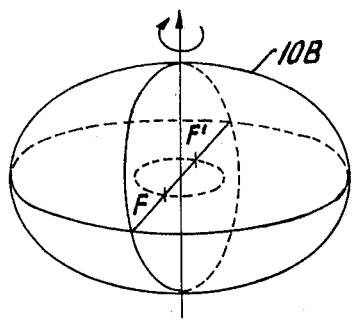
Figure 5A:
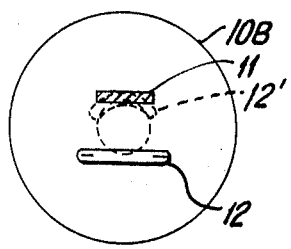

The objects, technical advantages and structure of the present invention will be better understood from the following description taken in conjunction with the accompanying drawings, in which:

FIG. 1 is a generalized perspective view of the reflector employed in embodiments of the present invention;

FIGS. 2(a) and (b) are cross sections of one embodiment of the present invention;

FIGS. 3(a) and (b) are cross-sectional views of another embodiment of the present invention;

FIG. 4 is a perspective view of another reflector employed in the present invention;

FIGS. 5(a) and (b) are cross-sectional views of still another embodiment employing the reflector of FIG. 4; and FIG. 6 is a cross-sectional view of a modification of the embodiment of FIG. 5.

Referring to FIG. 1, an ellipsoid-shaped reflector 10 as employed in the embodiments of the present invention is shown with the rectangular coordinates $x$, $y$ and $z$, having an origin coinciding with the center of the reflector 10. The diameters $2a$, $2b$ and $2c$ of the ellipsoidal reflector 10 are taken along the $x$, $y$ and $z$ axes, respectively. The elliptical intersection on the $x$-$y$ plane has its foci at points $F_2$ and $F_2'$. Similarly, the intersection on the $x$-$z$ plane has its foci at $F_1$ and $F_1'$.

Figure 2B:
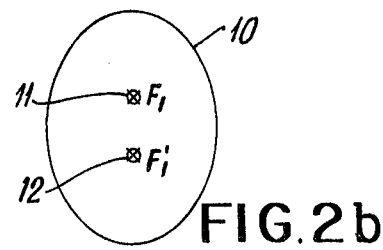

Referring to FIG. 2(a), an embodiment of the present invention comprises, within the reflector 10, a straight-lined laser material 11 and a similarly-shaped light source 12. They are disposed within the y–z plane in parallel with the y axis on which foci $F_2$ and $F_2'$ reside. More particularly, the midpoints of laser element 11 and light source 12 are respectively placed, as shown in FIG. 2(b), in spatial coincidence with foci $F_1$ and $F_1'$ lying on the z axis. The length of the element 11 and the effective length of the light source 12 are made equal to the space between foci $F_2$ and $F_2'$. Since these elements 11 and 12 are disposed at the foci $F_1$ and $F_1'$ at least at their respective midpoints, the light rays emanating from the light source 12 are efficiently concentrated onto the laser material 11. Although not shown in the drawing, a pair of small apertures are formed at the intersections of a line formed by extending the element 11 with the walls of the reflector 10. These apertures serve to form a laser resonator with suitable reflectors located external to the reflector 10 (not shown in the drawing).

Figure 3B:
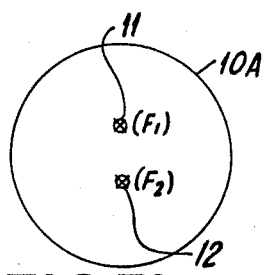

In the embodiment of FIG. 3, the reflector 10A takes the form of a prolate spheroid which corresponds to the particular case of the ellipsoid of FIG. 1, with $a=c$. In other words, the reflector 10A is an ellipsoid of revolution formed by turning the y–z-plane-sectional ellipse of FIG. 1 around the y axis. The laser element 11 and light source 12 are placed parallel to the major axis with a uniform and equal spacing therefrom. Since the x–z plane cross section is circular, element 11 and source 12 should be disposed as close to the center of the circle as possible. However, by way of enlarging the diameter (FIG. 3(b)), the circular section shows a good approximation of an ellipse which has its foci at points $(F_1)$ and $(F_1')$. To attain this approximation, this embodiment must inevitably be larger than the embodiment of FIG. 2. However, the embodiment of FIG. 2 facilitates the manufacture of the reflector, because it takes the form of an ellipsoid of revolution.

Referring to FIG. 4, another reflector 10B for use in the present invention has the shape of an oblate spheroid which is an ellipsoid of revolution formed by turning the ellipse around its minor axis. The oblate-spheroidal reflector 10B corresponds to a special case of the ellipsoid 10 of FIG. 1 with $a=b$. In other words, the reflector 10B is formed by turning the y–z-plane ellipse around the z axis of FIG. 1. This revolution forms a circular locus of foci on the x–y plane, as shown by dotted line in FIG. 4. The intersections between the locus and the chord on the x–y plane are designated by F and F'.

Figure 5B:
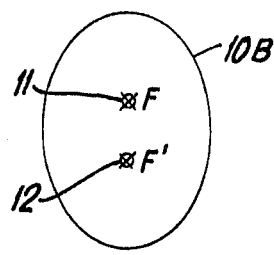

In the embodiment shown in FIG. 5(a), laser element 11 and light source 12 are disposed in parallel on the plane of the circular locus, tangentially to the locus. As is shown in FIG. 5(b), the straight-lined element 11 and light source 12 are placed in spatial coincidence with the foci F and F' of the ellipse seen in the x–z plane.

Inasmuch as the light source 12 is laid at its midpoint on the foci locus, the light rays emanating from the source 12 are efficiently concentrated onto the laser element 11 located on the other side of the locus complementarily to the source 12.

However, since the end portions of the element 11 and the source 12 project out of the locus of foci, the real image of the source 12 does not coincide with the element 11 but has a curved form as shown by 12' in dotted lines. To attain a sufficiently high irradiation efficiency, the real image 12' of the light source 12 should overlap the element 11 as much as possible. However, it is not desirable to bend the laser element 11, as is well known to engineers in this technical field.

In order to overcome this difficulty, a modification is made as to the embodiment of FIG. 5, as shown in FIG. 6. In this modification, the curve of the real image 12' (FIG. 5(a)) is compensated for by employing an outwardly curved light source 12A placed in the plane of the locus with its midpoint being in spatial coincidence with the locus. Thus, the irradiation efficiency is further improved.

The radius R of curvature of the outward bending of the light source 12A is determined by the diameters of the oblate spheroid, and the eccentricity of the x–y and y–z plane intersecting ellipses. Data for several samples is as follows (See FIG. 1 also):

| Sample No. | Diameter 2a (=2b), mm. | Diameter 2c, mm. | Distance of foci F, F', mm. | Radius of curvature R, mm. |
|---|---|---|---|---|
| 1 | 150.0 | 147.0 | 30 | 80–85 |
| 2 | 133.1 | 127.2 | 40 | 60–65 |
| 3 | 142.8 | 133.8 | 50 | 65–70 |
| 4 | 150.0 | 137.4 | 60 | 40–45 |

A series of experiments revealed that the irradiation efficiency is remarkably improved with this modification.

In the above embodiment and modifications, the light source 12 may be an arc lamp, filament lamp, or any other suitable means for optical excitation of the laser element 11. It should be readily understood that the modification of FIG. 6 is widely applicable to various shapes of the light source. In other words, the light source 12A may be in other forms than the circular arc. Although not particularly mentioned in the foregoing, the ellipsoidal reflective surface of reflector 10 may be formed of glass coated with a metal layer on its inner surface. Alternatively the surface may be cut from a lump of metal. As will be apparent to those skilled in the art, various further modifications are possible without department from the spirit and scope of the present invention.

We claim:

1. A solid-state laser device comprising an ellipsoidal reflector of a prolate spheroid shape, said prolate spheroid being an ellipsoid of revolution obtained by rotating an ellipsoid about an axis of revolution coincident with one axis of the ellipsoid, a solid-state longitudinal laser material disposed within said ellipsoidal reflector, and a longitudinal light source of a length substantially equal to the length of said laser material for irradiating said laser material, said laser material and light source being oriented parallel to said one ellipsoid axis and symmetrically spaced from said one axis, with said laser material and light source further being coincident with the respective foci of another ellipsoid axis and each being symmetrically placed with respect to said other ellipsoid axis.

2. The solid-state laser device of claim 1, in which said laser material has a length approximately equal to the distance between the foci on said one ellipsoid axis.

3. A solid-state laser device comprising:
   a reflector body of an oblate spheroid shape, said oblate spheroid being an ellipsoid of revolution obtained by revolving an ellipse around its short minor axis forming a circular planar locus of foci of said ellipse,
   a solid-state laser material disposed tangentially on said locus and within the plane of the locus,
   and a light source disposed on the circular locus opposite the side having the laser material and in parallel face-to-face relation with said laser material to supply light pumping power to said laser material.

4. The device as recited in claim 3 wherein said laser material is straight longitudinal and wherein said light source is bent with a curvature opposite to that of the circular locus to form an overlapping image of said light source on said laser material.